No. 751,860. PATENTED FEB. 9, 1904.
G. W. LA VOO.
APPARATUS FOR SCREW THREADING AND WELDING RINGS.
APPLICATION FILED DEC. 20, 1902.
NO MODEL.
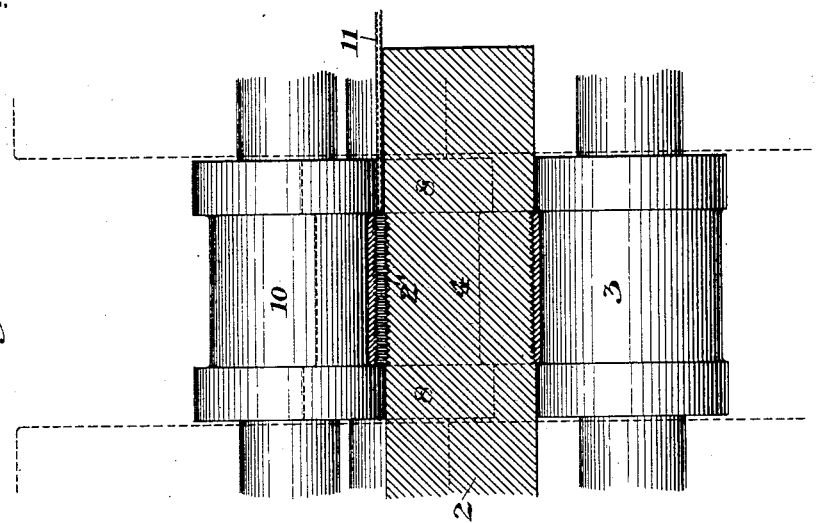
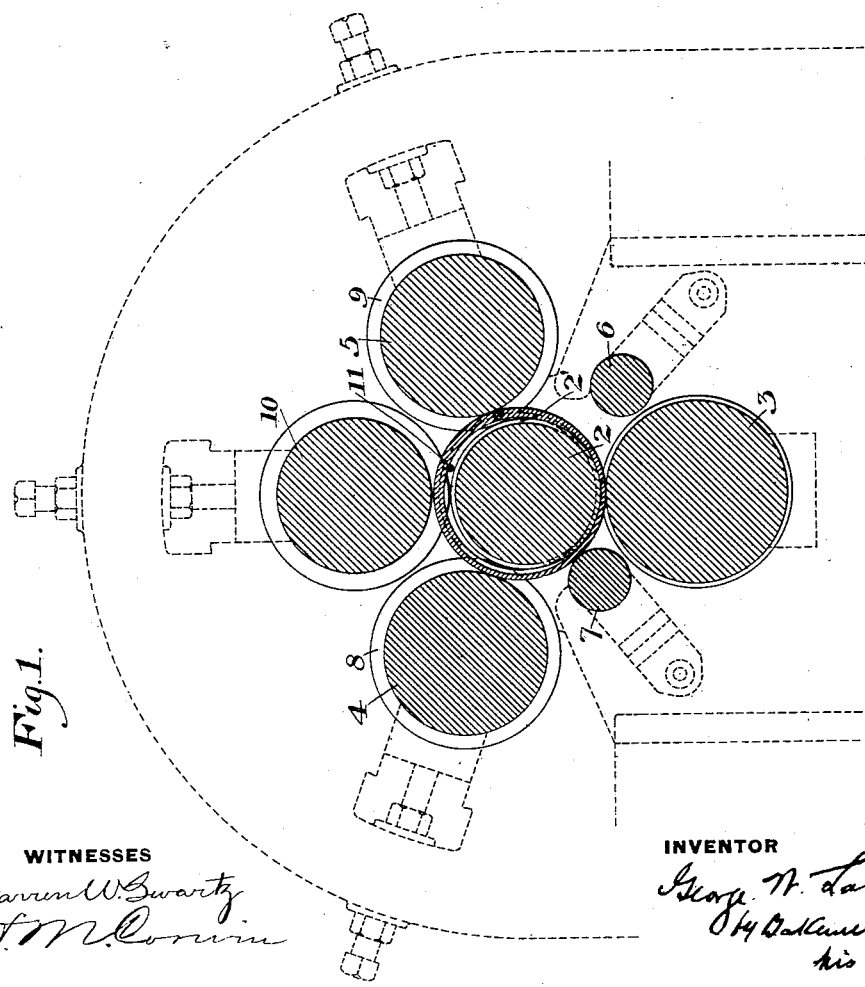
WITNESSES
INVENTOR
THE NORRIS PETERS CO., PHOTO-LITHO., WASHINGTON, D. C.

No. 751,860. Patented February 9, 1904.

UNITED STATES PATENT OFFICE.

GEORGE W. LA VOO, OF STEUBENVILLE, OHIO.

APPARATUS FOR SCREW-THREADING AND WELDING RINGS.

SPECIFICATION forming part of Letters Patent No. 751,860, dated February 9, 1904.

Application filed December 20, 1902. Serial No. 135,999. (No model.)

*To all whom it may concern:*

Be it known that I, GEORGE W. LA VOO, of Steubenville, Jefferson county, Ohio, have invented a new and useful Apparatus for Screw-Threading and Welding Rings, of which the following is a full, clear, and exact description, reference being had to the accompanying drawings, forming part of this specification, in which—

Figure 1 is a vertical cross-section showing the arrangement of the rolls in my improved mill; and Fig. 2 is a front elevation of the same, partly broken away.

My invention relates to the forming and screw-threading of ring-shaped articles from hot metal blanks according to the method set forth in my copending application, Serial No. 124,613, filed September 24, 1902.

The object of the invention is to provide a new and improved apparatus for carrying out the steps of rolling a blank into ring shape, forming a screw-thread upon it, and welding its ends; and, further, to provide improved means for adjusting the size of the ring or coupling formed to give accurate commercial results.

In the drawings I show a cluster-mill in which 2 is the mandrel, having an externally-threaded portion 2', beyond which the ends of the mandrel are plain and of a diameter equal to that of the threaded portion, though this diameter may be changed, depending upon the manner in which the article is formed on the mandrel. This mandrel is held centrally between rolls 3, 4, and 5, of which 3 is the pressing and welding roll, having a pass suitably shaped to force the metal of the blank against the mandrel and into its screw-threads, as shown in Fig. 2.

6 is an entering guide-roller in front of the roll 3, and 7 is a rotary guide-roller in the rear of and above the roller 3, which prevents the entering end of the blank from dropping down and forces it in contact with the mandrel.

I have shown the rollers 4 and 5 as being sizing-rollers, they having collars 8 and 9, which contact with the mandrel in its unthreaded portion. The body of these rolls is of such a size that the coupling is in contact with them during the rolling operation, such coupling being out of contact with the body of the top roll 10, which is cut back sufficiently so that its collar engages the mandrel, while the body will be out of contact with the coupling or ring, the size of which is fixed by the sizing-rolls 4 and 5. It will be noted that the axes of these rolls 4 and 5 are above the axes of the mandrel, and by raising or lowering the mandrel and adjusting the rolls 4 and 5 inwardly or outwardly the size of the coupling may be varied to bring it to exactly the desired size.

In my application above referred to I show the roll 10 as a sizing-roll, while the rolls 4 and 5 are the mandrel-holding rollers. Such a system may be used; but the present system is more desirable, for the reason that the ring or coupling is sized at three substantially equidistant points in its circumference. The rollers 4 and 5 give two points of support, where the top roller gave but one, and hence better results are obtained. The bearings for the rolls 4, 5, and 10 are adjustable, and the bearings for the roll 3 and the rolls 6 and 7 are all mounted in vertical slides at the ends, which may be adjusted in the housings.

In using the mill the heated blank is fed in over the roller 6 and is forced by the roller 3 into the screw-threads of the mandrel. As the blank is fed forward it is forced around the mandrel, which rotates with it, and is thus shaped into a coupling, the ends are welded together, and screw-threads formed upon its interior, all at the same operation. The mandrel is then slipped out endwise from the coupling, which is of larger diameter, the mandrel is replaced, and the next blank is fed in. If the shaping-rolls are arranged to cause the metal to tightly hug the mandrel, the mandrel may be screwed out of the welded article by making the end portions of a diameter equal to or less than that between the roots of the threads. The rolls may be water-cooled to keep them at the desired temperature, and a stream of water may be fed between the mandrel and the article by a pipe 11 to wash out any scale or loose particles which might interfere with the screw-threading. This water also keeps the points of the threads on the mandrel cool and prevents their burning or rounding.

The advantages of my invention result from the simplicity of the apparatus by which a blank is formed into a welded ring and screw-threaded at a single operation. The use of the two sizing-rolls is of advantage in adjusting accurately the size of the article. The rolling of a ring or thread-protector of larger diameter than the mandrel keeps the mandrel cool, as the surface in contact is reduced and the water admitted between them keeps the threads cool.

The apparatus may be varied in many features without departing from my invention.

I claim—

1. A cluster-mill having shaping-rolls, at least a part of which are adjustable, and a screw-threaded mandrel around which the said rolls are arranged; substantially as described.

2. In a cluster-mill, a series of shaping-rollers having end collars, and a mandrel having plain portions engaged by the collars, and an intermediate threaded portion; substantially as described.

3. A cluster-mill having a screw-threaded mandrel, and shaping-rolls arranged around the mandrel and having collars, at least one of the rolls having a body of reduced diameter arranged to be out of contact with the blank; substantially as described.

4. A cluster-mill having a screw-threaded mandrel, and a series of shaping-rollers, at least two of said rollers having collars and bodies arranged to contact with and size the article, and mechanism for adjusting said rolls; substantially as described.

5. A cluster-mill having a screw-threaded mandrel, oppositely-located rolls, one of which has a body reduced in diameter and out of contact with the blank, and two sizing-rolls arranged on opposite sides and contacting with the blank, said sizing-rolls being adjustable; substantially as described.

6. A cluster-mill having a central screw-threaded mandrel, a series of shaping-rolls arranged around it and arranged to form a ring of larger diameter than said mandrel, and a pipe having its end adjacent to the mandrel-threads and arranged to feed a current of cooling fluid in contact with said threads; substantially as described.

7. A cluster-mill having a screw-threaded mandrel and shaping-rolls arranged to feed a blank around the mandrel and screw-thread it, said rolls being arranged to form a ring of larger diameter than the mandrel; substantially as described.

In testimony whereof I have hereunto set my hand.

GEORGE W. LA VOO.

Witnesses:
L. M. REDMAN,
H. M. CORWIN.